Feb. 19, 1946.  D. F. OTHMER  2,395,010
PROCESS FOR DEHYDRATION OF ACETIC ACID AND OTHER LOWER FATTY ACIDS
Filed Feb. 17, 1941
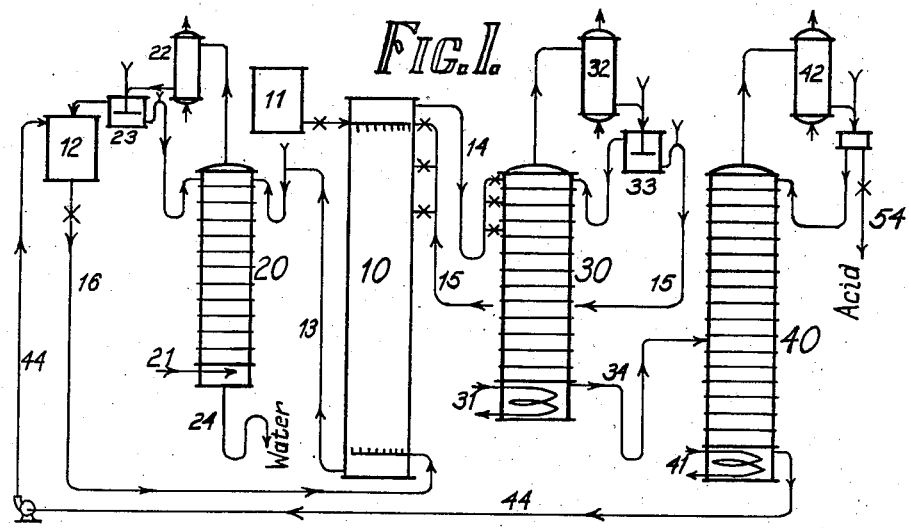
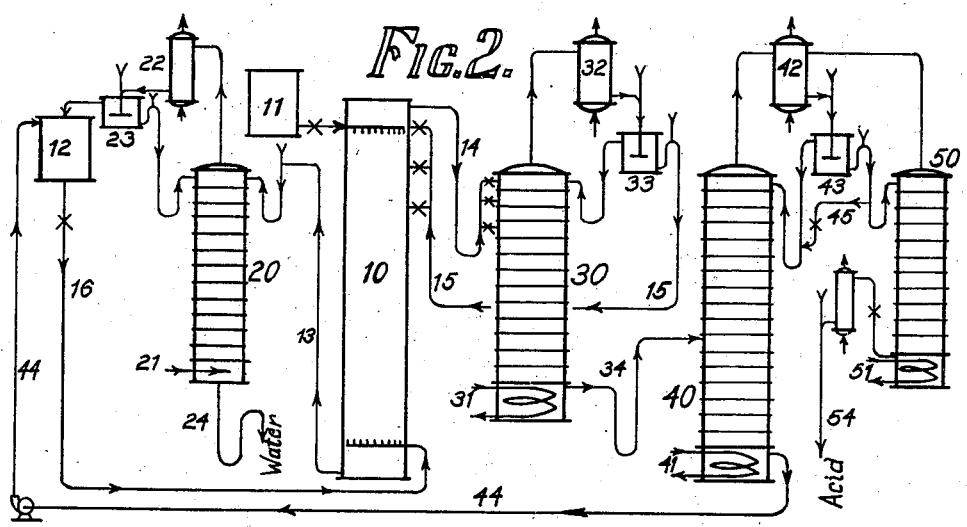
INVENTOR.
Donald F. Othmer.

Patented Feb. 19, 1946

2,395,010

UNITED STATES PATENT OFFICE 2,395,010

PROCESS FOR DEHYDRATION OF ACETIC ACID AND OTHER LOWER FATTY ACIDS

Donald F. Othmer, Coudersport, Pa.

Application February 17, 1941, Serial No. 379,346

6 Claims. (Cl. 260—541)

This invention relates to a process for the concentration of aqueous solutions of the lower fatty acids, for example, acetic acid, the removal of part or all of the water therefrom, and the production thereby of a concentrated acid.

Of the several processes for the concentration of aqueous solutions of one or more of these acids using a selective and counter current extractive action of an organic solvent, the following may be mentioned:

The use of a low boiling solvent such as ether or chloroform which may readily be separated from the concentrated acid after the extraction operation by fractional distillation.

The use of intermediate boiling solvents such as butyl acetate which may be used as azeotropic withdrawing agents and separated from the concentrated acid according to the method of my United States Patent No. 2,050,234.

The use of intermediate boiling solvents in which the water in the mixture of solvent, acid, and water obtained by the extraction is removed by azeotropic distillation with a suitable added material, and the acid by azeotropic distillation with the same or another added material.

The use of solvents of sufficiently higher boiling point than acetic acid, so that after extraction of the dilute acid in either the liquid or the vapor phase, the acetic acid and water may be removed together from the solvent by fractional distillation and subsequently separated by other means.

It is to the class of intermediary solvents that my invention belongs although it contemplates certain improvements useful in other classes of processes for concentrating acetic acid, including also those employing azeotropic distillation.

The use of intermediary solvents or mixtures thereof boiling between 102 and 150° C. in both the extraction and the azeotropic distillation operations of separating water from acetic and other lower fatty acids is well known. A marked disadvantage appears due to the fact that, in many cases, fractional distillation will not serve to separate excesses of the solvent from the acid. In my United States Patent No. 2,050,234 is described one method of handling this operation so that the solvent may never be in excess; and the acid is finally separated from the last of the water in the absence of solvent. This method has a large utility, especially in those operations involving only azeotropic distillation. My present method is concerned with operations involving an excess of solvent over that amount in the azeotropic mixture.

Ricard and Guinot describe another extraction method utilizing an intermediary boiling solvent, together with a separate and additional entrainer for the water, in Patent No. 1,860,512, and they summarize, in claim 11, their method: "which comprises extracting the acid from the aqueous acid by solvent action, then subjecting the resulting mixture of acid, solvent and residual water to fractional distillation in the presence of an entrainer insoluble or sparingly soluble in water and capable of yielding with acetic acid a mxture having a minimum boiling point, withdrawing the solvent as a tail product, removing from the head of the still a mixture of entrainer and water, condensing this vapor and decanting the condensate, removing from the still at a lower point the vapor of a mixture the composition of which is very close to that of the binary azeotropic mixture of acid and entrainer, condensing and decanting this mixture, returning to the still the layer containing the entrainer, and withdrawing the concentrated acid which constitutes the other layer obtained from the latter mixture."

This process utilizes an entrainer which is added to the extract layer in addition to the solvent therein. It has one azeotropic mixture with acetic (at 94° C. and containing 30% acid) and another with water (at 80° C. and containing 10% water); and by means of long and efficient columns the separation may be made through the expenditure of considerable heat in the water removal part of the system.

Thus, the heat required to vaporize the water in the extract layer (that from the extractor containing substantially all of the acid originally charged and some of the water) is that required to vaporize one pound of water plus, at the minimum, that required to vaporize nine pounds of entrainer.

Of equal interest is the fact that water is removed, mixed with acid; and acid is removed mixed with water. The water with acid, removed from the upper or water decanter, will necessarily contain a certain amount of entrainer dissolved therein; and this entrainer will either have to be stripped therefrom by an auxiliary distillation or it will pass to the extractor where it will represent a disadvantage in the extraction. Exemplary liquids given of this added entrainer (and, in fact, all liquids suitable for use in this way) have a very low solubility for acetic acid when a water layer is present. Thus, the ratio of concentrations in the added entrainer layer to that in the water layer may be of the order of 1 to 20 or 1 to 30, whereas the corresponding ratio for a good solvent is of the order of 1 to 1 or at the worst 1 to 1½ or 1 to 2. The continuous passage of the water layer containing dissolved therein some added entrainer for acetic acid back to the extractor will add this entrainer to the solvent with a corresponding reduction in the partition coefficient of the solvent-entrainer mixture and thus with a loss of the effectiveness of the extractor.

Ricard and Guinot in the United States Patent No. 1,839,894 (e. g. claim 2) disclose another method of accomplishing the removal of water by itself from its mixture with an intermediate solvent and acid in the extract layer as "the step which comprises dehydrating the resulting mixture by distilling the same with the addition of an auxiliary entraining liquid so selected as to produce with water a mixture having a low minimum boiling point, prior to removal of the acetic acid from the solvent by distillation."

Representative entrainers added to the extract layer in addition to the solvent therein which are specified in United States Patent No. 1,839,894 are propyl acetate, ethyl acetate, and di-isopropyl ether. Using these solvents, the heat required to vaporize the water in the extract layer is that required to vaporize one pound of water plus, at the theoretical minimum, that required to vaporize 6.3 pounds of propyl acetate, 15 pounds of ethyl acetate or 31 pounds of di-isopropyl ether.

It is expected that in this last mentioned process the dehydrated acid-solvent mixture will be separated by straight rectification of the acid from the solvent; and the example given utilizes amyl acetate, one of the higher boiling materials of the group.

Another method aimed at aiding the separation of the dry solvent from the acetic acid is that of Ricard and Guinot's United States Patent No. 1,839,932 wherein (claim 5) are steps comprising extracting, "then dehydrating the resulting mixture of solvent and acetic acid by distillation in the presence of an auxiliary entraining liquid which forms with water a minimum boiling point mixture, drawing off the dehydrated mixture of acetic acid and solvent in the presence of a second auxiliary liquid which forms with the acid a binary mixture of minimum boiling point, condensing the binary mixture of acetic acid and the second auxiliary liquid and causing the same to separate into two layers in the presence of a small proportion of water, returning the layer rich in the second auxiliary liquid to the distillation zone where the dehydrated mixture of acetic acid and solvent is distilled, and forwarding the layer rich in acetic acid to another distilling zone from the bottom of which the acetic acid is recovered."

A favored entraining liquid which must be added to the extract layer in addition to the solvent therein is propyl acetate again, by which (as shown in United States Patent No. 2,050,234) at least 6.3 pounds of propyl acetate must be distilled per pound of water removed.

The advantage as entrainers of certain liquids which individually or in mixtures with other liquids boil between 102° and 150° C. has been described in my United States Patent No. 2,050,234 and its continuation No. 2,170,834. The advantage of many of these same liquids as solvents for the lower aliphatic acids is also known. The present invention is concerned with the use as the entrainer in the azeotropic distillation for the dehydration of the extract layer, of the same liquid which has been used as the solvent in the first, or extraction, step in order to use to the fullest extent the advantageous properties of this group of liquids. This has not heretofore been done.

In many cases a mixture of two or more of my preferred materials is desirable; and in some cases, materials boiling outside the specified range added in greater or less quantities to other materials may be used since their mixture comes within the desired temperature limits of boiling range. Furthermore, in some cases, the desired material which is at once a solvent for the acid, but not for the water, and an entrainer for the water, but not for the acid, may be formed or result from the process itself; as, for example, by the addition of alcohol to the system a more or less complete esterification with a small part of the acid itself may result under the conditions of operation hereinafter specified in the production of an alcohol-ester mixture. Also, by the addition of an ester to the system, a more or less complete hydrolysis may result under these preferred conditions in the production of the corresponding alcohol-ester mixture. The final and exact ratio of alcohol to acid is a result of the conditions prevailing in the particular system. It may even vary from point to point in the system, although the alcohol concentration in such a solvent mixture will usually be above 1%. Thus, it is, of course, desirable to select ester-alcohol combinations wherein both members and any mixture fall within the specified boiling range of my preferred materials, since then both members and any combination thereof are effective.

These alcohol-ester combinations may be regarded as one group of solvents, since they so act; and either may not usually be used alone without soon having a greater or less percent of the other. Furthermore, I have found in my preferred method of operation using commercially available esters (containing small amounts of the corresponding alcohols) for my combined extractor-entrainer material that, instead of being a binary azeotrope at the head of my dehydrating column, there may be maintained a ternary azeotrope. Thus, instead of being a binary vaporous mixture of approximately 2½ pounds of butyl acetate per pound of water, there is a ternary azeotropic mixture of approximately one pound butyl acetate plus three quarters of a pound of butyl alcohol per pound of water; or if normal amyl acetate is being used, instead of approximately 1½ pounds of amyl acetate per pound of solvent, there may be maintained a mixture of approximately ⅕ pound of amyl acetate and ⅗ pound of amyl alcohol per pound of water. Thus, the total of alcohol plus ester in the ternary mixture is much less per pound of water in both cases than the amount of ester alone in the binary mixture, and by the operation using this mixture in this manner, an even lower amount of heat per pound of water removed is made possible.

Two other groups which are also useful as extractor-entrainer liquids in the preferred method of operation are the ethers and the ketones which boil within the limits of my preferred materials. Other useful solvents also are in this boiling range.

Thus, the very considerable heat required and heretofore used for this dehydration of the extract layer by requiring, as a minimum, the vaporization of from 6.3 to 31 pounds of entrainer per pound of water removed has been reduced to that required to vaporize only about 1.75 pounds of the butyl acetate-butyl alcohol mixture or about 0.8 pound of the amyl acetate-amyl alcohol mixture or about 1.1 pounds of methyl n-amyl ketone or about 2 pounds of n-butyl ether. These figures give the ratio of entrainer to water in the azeotropic mixture; and, since the latent heats of these entrainers do not vary greatly, these figures give a rough measure of the amount of heat required to vaporize the entrainer required to carry over one pound of water. My preferred materials have much less mutual miscibility with water, however, than the lower boiling entrainers of the prior art (solubility of water in ethyl acetate is 11.01 pounds per 100 pounds ester while that of amyl acetate is .5 pound per 100 pounds of ester. (The ratio of the respective solubilities of these esters in water is even greater.) Thus the ratio of solvent to water in the azeotropic mixture does not show up to its full extent the relative poorness of these lower boiling entrainers because much of the water brought over is dissolved in the large amount of entrainer and returned to the column, for subsequent distillation at increased heat cost. Furthermore, the hydrolysis of the lower esters is so great that, when used as entainers, there is always a large amount of the respective alcohol present which greatly increases the mutual miscibility of the decanting liquid layers. Solubility of water in the entrainer layer means that water so returned to the column will again have to be distilled out with the accompanying entrainer, thus repeating the heat costs.

Using the ester-alcohol class of my preferred entrainers this relatively low mutual miscibility with water gives a second very large advantage even over that realized from a comparison of the azeotropic ratios and heat requirements considered qualitatively above and quantitatively hereinafter in the examples. If other entrainers of this group are used, they also will have these advantages; and the comparative heat costs of water removal using them is also less than would be apparent from such a comparison.

In my forementioned United States Patents No. 2,050,234 and its continuation No. 2,170,834, I showed that there was a considerable difficulty involved in separating an excess of an intermediary solvent boiling from 102° to 150° C. from acetic acid, for example. The processes of these patents provided, therefore, that in an azeotropic system all of the solvent be removed from a resulting mixture of acid and water. It is difficult or impossible to conduct an azeotropic distillation as therein described on an extract layer, however, since there is always a large excess of solvent present over that required to azeotropically remove the water present. I have now found that in the case of the operation of an extraction as a first step in the process of dehydration, the water in the extract layer may be removed most economically by an azeotropic distillation using the solvent itself as the azeotropic agent (because of its high entraining power). The acid and solvent remaining may then be separated by ordinary distillation, or, if desirable or necessary, by the use of a single added liquid as an entrainer for the withdrawal of acetic acid in an azeotropic distillation away from the dry solvent.

The use of the extracting solvent itself for the removal of the water remaining after the extraction either substantially free of acid or containing an amount of acid not too great to be removed by extraction is a principal object of my invention and results in a large economy of heat and of equipment (the two principal costs in recovery of acetic and homologous acids).

The separation of acetic acid from an extracting solvent boiling in the range of 102° and 150° C. either by ordinary distillation or by the use of an added liquid which entrains the acid from the dry solvent, is well known to those skilled in the art and is not per se novel with my invention.

I have found that, in many cases, liquids boiling between 102° and 150° C. are used in this combined extraction and azeotropic dehydration operation, the low amount of solvent distilled per pound of water is insufficient (acting as a reflux wash in the azeotropic column) to hold down from the top of the column all of the acid. Thus, the so-called "sweet-water" layer, (i. e. water removed by decantation) is not entirely free of acid. Methods usually used for controlling the distillation to prevent acid coming over in the water layer are (1) the use of a dephlegmator condenser prior to the condenser supplying the decanter, (2) the return of a part of the water layer, (3) the selection of the liquid entrainer so as to give the right amount of entrainer itself in the azeotropic ratio to give the desired reflux (as indicated in my United States Patent No. 2,204,616), (4) the recycling of an additional amount of entrainer which is obtained from a later stage of the process as added reflux, as hereinafter described, or (5) increasing the length of the distilling column, and therefore its efficiency.

The first and second methods obviously require an added amount of heat over that required in the azeotropic mixture, and the third method is not always possible because of the other limitations set up in the selection of my preferred materials. Thus, if the high efficiency as entrainers of some of my solvents is to be utilized, and the fourth method is left for later consideration, it appears that there is no other method of controlling the amount of acid coming over with the azeotropic mixture of solvent and water vapors, save increasing the length of the column; and this has only a limited effect since the amount of reflux solvent in the azeotropic ratio may often be less than a "minimum reflux" below which a substantially acid-free sweet water may not be secured. Therefore, acid will be discharged to a greater or less extent in the water layer. In all previous processes showing the use of an entrainer for the water which does not form an azeotropic mixture with the acetic acid itself, the water layer is invariably discharged to waste and this acid loss would be irrecoverable under those conditions.

I have found now that by recirculating this water layer, containing some acid, back to the extractor, the acid may be exhausted and this water discharged substantially acid free with the rest of the water separated in the extractor. Obviously, since the water layer is saturated with solvent in any decantation operation, there will be carried back a small part of the solvent. This is immaterial since only one liquid is used and this acts both as solvent for the acid and as entrainer for the water; but this recycling of the decanted water layer might result in a serious contamination of solvent by an auxiliary entrainer in those processes where different liquids are used in the two steps.

It is, of course, often possible to operate the azeotropic column for water removal from the extract layer so as to eliminate almost completely the acid from the water layer in the decanter.

In this case, and if this water is below about 1% in acid strength, it may often be passed, without serious acid loss in the process as a whole, directly to the stripping column for recovery of solvent from the water discharged from the extractor. On the other hand, it may be of higher acid strength than 1%; and, depending on the length and efficiency of the column, the strength of the feed and other facts, it may be of a strength approaching that of the feed itself. It would then be recycled to the extractor for exhaustion, as above mentioned.

For the operation of the azeotropic column in the usual manner, it is necessary that the acid strength of the vapors leaving the top be low enough so that on condensation two layers are formed in the decanter; and I prefer to operate in this manner by the use of a sufficient number of plates in this column (even though two layers could be obtained if the acid strength was above this critical value by the addition of a small amount of water). There will thus be a maximum strength of acid in the water layer, below which decantation will not be possible. This maximum strength also corresponds to the maximum desirable strength of extraction which is mentioned in my patent, United States No. 2,170,834, since both determine the point just below miscibility of the two layers. In extracting some solutions of dilute acetic and/or other acids, a range of concentrations (usually low) may be encountered wherein the decanted water layer from the azeotropic system is of a strength higher than that of the original feed, but lower, of course, than the maximum strength that may be extracted. In this case, it may be desirable to increase the efficiency of the extractor to accommodate this strength of acid from the decanter—or to accommodate the strength of acid which would result from a mixing of this acid with the original acid. Yet another method which I have sometimes found to be more economical, particularly if the amount of acid to be handled is very large is to use an auxiliary extractor to remove the acid from this aqueous layer from the decanter either entirely, or sufficiently to give a solution no greater in strength than that of the original feed, with which it is mixed.

Furthermore, I have found, even with those materials wherein it is possible to separate the azeotropic mixture leaving the column completely free of acid (and thus to have a substantially acid free layer in the decanter) that it may not always be most desirable to do so. The operation of a shorter distilling column, although it allows a greater or less amount of acid to come over the top and into the decanter may result in a column costing so much less that the very slight increase of load thrown upon the extractor is much more than balanced by the lower initial cost of the distilling column. Thus, whereas in the prior art using butyl acetate or other materials in this boiling range as azeotropic distilling agents, it has been the practice to use as many as from fifty to sixty plates in the azeotropic column in order to reduce the acid in the sweet water to an insignificantly low amount and to substantially eliminate water at the base, I have found that a number of plates between ten and twenty may be used in the present process and to entirely eliminate water at the base, although, of course, there is some acid in the water layer of the decanter. Because of the expensive materials of construction and the considerable metal weight necessary to withstand corrosion, distilling equipment for acid recovery is very expensive; and this saving of cost of the azeotropic column is very considerable when the column is shortened in this manner. I have thus found that it is often possible to entirely eliminate the rectifying part of the azeotropic column (i. e. that part above the feed plate) and thus to operate merely an exhaustion column for the water from the acid-solvent mixture.

It is well known in the separation of acetic acid and water in any type of extraction or distillation process that by far the greater efficiency (or greater number of theoretical equilibrium units between the two phases) is required for accomplishing the removal of the last few per cent of the acid from the water (i. e. entirely purifying or rectifying the water free of acid in the rectifying part of the column which is that part of the column above the feed inlet and usually the largest parts). Since the bulk of the water is always discharged from the extractor with no further attempt at recovering this acid, the extractor must in every case have a sufficient number of equilibrium units to accomplish this almost perfect separation.

Also, if water is to pass from the decanter so nearly free of acid that it may be discharged without further recovery of acetic acid, the azeotropic unit must have a like high efficiency. By allowing acidulated, rather than acid free water in the decanter the required efficiency of the azeotropic column is, however, greatly reduced. This acid must, thereafter, be recovered by the extractor which, in any event, necessarily has to be made sufficiently efficient to discharge the bulk of the water in a substantially acid free condition. Thus, the extractor may be the only unit of the required high efficiency. Furthermore, the extractor is relatively cheap in construction cost as compared to the azeotropic column; and the increase in its size, but not of its efficiency to handle this relatively small additional amount of liquid coming from the decanter is of no importance.

As an illustration, in case the dilute acid is approximately 28%, as it might be in a plant recovering acetic acid from cellulose processing, the ratio of water to acid in the extract layer might be approximately 1 to 3 (more or less depending on the nature of the solvent, the amount of it used, and the efficiency of the extractor). Thus, from 100 pounds of feed containing 28 pounds of acid and 72 pounds of water, there would be approximately 28 pounds of acid and 9½ pounds of water in the extract layer. The 9⅓ pounds of water is later discharged containing some acid from the azeotropic column and its decanter; and if it is then returned to the extractor, it will be a relatively insignificant addition to the feed (less than 10% and, in the usual case, only 2 to 3% of the total liquid, feed and solvent passed therein).

Furthermore, it is apparent from the above illustration that the acid strength discharged from the decanter may be of an amount up to that of the original feed (in this case 28%) without changing the required efficiency of the extractor; which is, of course, designed to remove the acid from a 28% feed and discharge substantially acid free water therefrom. In practice an acid of a strength as high as the original feed is not encountered unless only a relatively few plates are used in the azeotropic column; but since it must be rehandled by the extractor anyway, if any appreciable amount of acid is present, it may as well be of a strength up to that of the feed and thus reduce the length of the azeotropic column as much as possible. The maximum reduction is, as mentioned above, the entire elimination of that part of the column above the feed plate if, as is usually the case, a liquid feed is used.

In the operation of extraction and distillation equipment, the feed should be introduced at that point in the equipment where the same concentrations are encountered. Therefore, I prefer in those cases where the acid concentration is lower in the water layer of the decanter following the azeotropic column than in the original feed to introduce this water layer from the decanter into the extractor at a point somewhat removed from the end where the feed enters so that it may enter where the acid concentration in the aqueous layer is approximately the same. If this dilute acid is os strong as the feed it will, of course, enter with the feed.

My above mentioned United States Patents No. 2,050,234 and No. 2,170,834 list a group of intermediate azeotropic withdrawing agents boiling between 102° and 150° C., which may be used with relatively more or less efficiency for both the extraction and distillation operations of my present invention; wherein, after extraction, the extract layer is dehydrated by azeotropic distillation using as entrainer the extracting solvent; and the mixture of acetic acid and the large amount of solvent present is separated by an azeotropic distillation of the acetic acid therefrom or by an ordinary or straight distillation. Both those liquids boiling below acetic acid and those liquids boiling above acetic acid in this group may be used.

In those cases wherein it is desirable to separate the acetic acid from the solvent by an azeotropic distillation rather than by straight distillation, I use, as the added entrainer, a material having a minimum azeotropic boiling point with acetic acid at as low a temperature as possible and with as high an amount of acetic acid in this mixture as possible. Suitable materials are to be found among the hydrocarbons and the halogenated hydrocarbons boiling in the range of about 100–150° C., although I usually prefer to use those boiling in the range of 100–125° C.

The following examples of the operation of my invention are to be regarded as illustrative only of some of the more important features, but are not to be regarded as limitive in any way; and many more examples which might be given would be necessary to exhaust the range of combinations and utility of this method. It is assumed that operations are conducted for a sufficient period of time so that the various pieces of equipment are charged and operating at a steady state; also that certain very small amounts of materials at various stages may be neglected in weight quantities for convenience in the examples. Furthermore, while my process will operate to concentrate solutions of acetic acid, it may also be used if solutions of other lower aliphatic acids are to be concentrated and if two or more of such acids, including acetic, are to be recovered. Also the process may be used to handle liquids resulting from various manufacturing processes where such solutions contain various impurities. Slight modifications or added steps familiar to those in the art are sometimes necessary to accommodate such impurities. Others of these steps are novel with my invention, and will later be considered in detail.

Thus, in Figure 1 is shown the extraction in the extractor 10 of an aqueous acetic acid with normal amyl acetate boiling at about 148° C. (For the purposes of this example, it is assumed that the acetate is used as such and that no amyl alcohol is added or formed in the system.) Using 100 pounds of a 28% solution of acetic acid in water added from feed tank 11 by a valved feed line, some 400 pounds of n-amyl acetate (added from solvent tank 12) may be circulated countercurrently in an efficient unit to extract all but a very small amount of the acid (a fraction of a pound so small that it will not be indicated in this example). There is discharged in line 13 the 72 pounds of water originally added which includes the 62.7 pounds first exhausted plus 9.3 pounds returned after passing through the azeotropic dehydrating system. The total contains about 0.2 pound of amyl acetate and about 0.1% acetic acid and goes to stripping column 20 which is supplied at the base with steam by line 21. Condensation in condenser 22 of the vaporous azeotropic mixture resulting, gives in decanter 23 a solvent layer containing 0.2 pound of amyl acetate which is returned to solvent feed tank 12. Substantially pure water (72 pounds plus the weight of the condensed steam, if open steam is used for heating this still) discharges from the system through line 24.

The extract layer contains 399.8 pounds of amyl acetate, approximately 28 pounds of acetic acid and 9.3 pounds of water; and tne acetic-water concentration is thus 75% (exclusive of solvent) as compared to the original 28%. This mixture is passed through the line 14 to the azeotropic column 30 (heated by a steam heating unit 31); and the water is removed (along with a small amount of acid) in an azeotropic distillation using the solvent, amyl acetate, itself as the entrainer. Approximately one pound of water is brought over by each 1.44 pounds of amyl acetate.

(In the continuous operation an amount of amyl alcohol would be allowed to accumulate in the azeotropic system, and the ternary azeotrope which results has about 0.80 pound of the ester and alcohol together per pound of water. The introduction of this fourth component, however, complicates the example.)

The azeotropic mixture is condensed in condenser 32 and separated into two layers in decanter 33. If column 30 is relatively short, there may be separated in the water layer an acid solution of about 5% (or a little less than .5 pound acid which is not considered for the purpose of this example). This decanted water or dilute acid passes by line 15 to the extractor 10 which it enters at a point where the concentration of the aqueous layer is about 5%. If line 14 enters at or near the top of the column 30 and the rectifying section is thus eliminated, with the exhausting section of a more or less constant length, the column length is greatly reduced and the acid accompanying the 9.3 pounds of water will be greater and may increase to as much as 3.6 pounds; where the resulting concentration of the liquid flowing back to the extractor in line 15 would approximate that of the feed liquid. In this case, the line 15 might pass to the original feed tank 11 or to the extractor at the same point as the feed line from 11. The acid is, of course, extracted, and passes out in the extract layer again to 30, with a corresponding adjustment of the amounts and concentrations as expressed above.

The mixture of 399.8 pounds of amyl acetate and 28 pounds of acetic acid discharged from the base of 30 represents the same ratio of solvent and acid as that coming from the extractor since, after regular operation is established, practically no solvent-entrainer liquid is lost in the azeotropic distillation. The mixture passes by line 34 to the distilling column 40, heated by steam coil 41; and with vapors of substantially pure acetic acid separating and discharging from the top due to the action of ordinary rectification. Condensed in condenser 42, a fraction is returned as reflux to the top of 40, and the balance (28 pounds) discharges from line 54 as substantially anhydrous acid. The amyl acetate, stripped of acid, is returned to the extractor 10 for reuse by way of line 44 and solvent storage tank 12.

The operation and figure of this example are analogous to that of Example 1 of United States Patent No. 1,839,894; except that n-amyl acetate rather than a lower boiling isomer is used. The essential difference is, however, that the amyl acetate itself removes the water from the extract layer in an azeotropic distillation rather than requiring the addition of a second material, ethyl acetate. The latent heat of the amyl acetate distilled with the water in the azeotropic mixture of this example when the solvent acts also as the entrainer for the water is approximately 2800 B. t. u., while to remove this same water by ethyl acetate as used in the example of United States Patent No. 1,839,894 would require 34,400 B. t. u., or over 12 times as much. This large difference in latent heat required at this stage of the process shows the essential advantage of my invention, as this dehydrating step uses most of the heat consumed. Furthermore, the column 30, which is by far the most expensive piece of equipment in the unit, may be greatly reduced in cross sectional size, so that it is not over one quarter to one sixth as large due to the much smaller amount of vapor to be handled; and also it may not be over 50% as high, due to the fact that acid free water is not required. Hence its cost may not be over 10–20% of the cost of the corresponding column of the prior process. The comparison is even much more advantageous in favor of my process as compared to iso-propyl ether, another favored material for this azeotropic distillation in United States Patent No. 1,839,894.

While using methyl amyl ketone boiling at 149° C. and one of the preferred materials of my Patent No. 2,170,834, both the heat cost of operating this azeotropic distillation column 30 and its size are still further greatly reduced due to the fact that the extract layer passing to the column contains a lower amount of water (i. e. a higher effective acid concentration) because of the relatively greater insolubility of water in methyl-amyl ketone, and because of the relatively small amount (1.1 pounds) of methyl-amyl ketone required to bring over one pound of water in an azeotropic distillation.

A third example may be, as mentioned above, the use of a mixture of amyl acetate-amyl alcohol to give a ternary azeotrope at the top of the dehydrating column with a corresponding advantage over the binary azeotrope of the amyl acetate alone of the first example. The heat requirements are lower than those indicated and the column sizes also lower.

A fourth example may be cited using butyl acetate both as the extracting solvent and as the entrainer for dehydrating the extract layer as is shown in Figure 2. The operation of the extractor 10, the stripper column 20, and the azeotropic column for water removal 30 together with the accessory parts may be regarded substantially as in Example 1, with somewhat different ratios of the several liquids at the several points in the system.

It is often possible to operate in such a manner that little or no acetic acid is present in the water layer of decanter 33; and then the water layer may be passed directly to water stripping column 20 for solvent removal rather than to the extractor 10. Furthermore, as has been mentioned, the alcohol-ester-water ternary azeotropic mixture, or these three materials in some slightly different ratio, may be operated at the head of the column rather than the binary mixture indicated.

As is shown in my United States Patent No. 2,050,234, the separation of the anhydrous mixture of butyl acetate and acetic acid discharged from the dehydrating column 30 may not be accomplished by ordinary rectification economically, as was the case with amyl acetate and acetic acid in the last example. Thus, there is charged into the column 40 of Figure 2 an approximate amount of a liquid which forms an azeotropic distillation with acetic acid, but not with the solvent, butyl acetate. Such a liquid may be an aromatic hydrocarbon such as toluene which has a constant boiling mixture with acetic acid boiling at 107° C. and containing 38% acetic acid, or an aliphatic hydrocarbon such as heptane (95° and 17% acetic), octane (113° and 44% acetic), or mixtures of hydrocarbons obtained by carefully fractionating petroleum. This liquid may, of course, be a mixture of several materials if the properties of the resulting mixture are suitable. The boiling point or range of the liquid chosen may vary; and the higher this boiling range is the greater the percentage of acetic acid in the azeotropic mixture and the higher the boiling temperature will be for this azeotropic mixture. Higher boiling temperatures of this azeotrope (i. e. closer to that of acetic) may add to the difficulty of complete exhaustion of the acetic from the butyl acetate.

All of these entrainers for acetic acid form homogeneous constant boiling mixtures, i. e. there is only one liquid layer in the condensate leaving the condenser 42, although in the corresponding process, concentrating other aliphatic acids than acetic, the analogous constant boiling mixture of the hydrocarbon or halogenated hydrocarbon with acetic acid may separate by itself into two layers, as do azeotropic mixtures of water and solvents. In order, therefore, to accomplish the separation of the acetic acid from its entrainer, the condensate may be allowed to flow to decanter 43, to which is added a small amount of water. The water causes the immediate separation into two layers, a lower layer—principally acid, and an upper layer—principally entrainer. The entrainer layer carries a small amount of acid and water back to the column 40 and serves the purpose of reflux in the ordinary distillation column. It may in some cases be desirable or necessary to return, as additional reflux, a part of the acid layer through the auxiliary valved line 45. The acid and the small amount of water distill over again; and neither approaches the bottom of the column where the substantially pure solvent goes through pipe 44 back to the storage tank 12 and thence to the extractor 10 for re-treating more feed.

The acid layer—containing a little water and entrainer—passes to the column still 50 which distills the water and entrainer, along with some acid, as a vaporous mixture passing to the condenser 42. (An auxiliary condenser with separate decanter and means for control of reflux may, in some cases, be desired.) A certain small amount of water thus cycles with the entrainer in the upper part of columns 40 and 50, condenser 42 and decanter 43. The substantially pure acid (free of solvent, entrainer and water) passes from line 54 in either a liquid or vapor state as may be desired.

I have found that in some cases, whether using a straight rectification or an azeotropic rectification in column 40, it is desirable to allow a certain amount of water to be discharged along with the solvent-acid mixture at the base of the column 30. This water will pass over with the acid in column 40 and its amount will depend to some extent on the desired strength of acid discharged from the system. If column 50 is used, the water will usually be discharged at its base along with the acid, although other provisions may be made for removing it as dilute acid in the decanter 43. The presence of this water helps in some cases in the separation of acid from solvent in 40, although there is a tendency for a steam distillation to be encountered in this column. If column 40 is operated as an azeotropic unit, the temperature of the azeotrope at the top will be lower than that of this steam distillation of water and solvent and thus the separation may be made.

In the examples above, it is apparent that a considerable amount of sensible heat is involved for the heating of the liquid feed to the several distilling columns 20, 30, 40 and 50 (although if condenser 42 operates so as to discharge liquid almost at its boiling point to decanter 43, little sensible heat will be involved in column 50). The heating of the liquids passing in lines 13, 14 and 34 to temperatures near or at that of the respective distillation systems may be accomplished by heat interchangers utilizing the sensible heat of the liquids passing in lines 24, 44 and 54 (if liquid acid is discharged) and vaporous heat otherwise absorbed by condensers 22, 32, 42 and the condenser for acid vapor in line 54, if acid is discharged as a vapor. Suitable combinations of such heat interchangers, as well as the heat economizing method indicated in United States Patent No. 1,839,894 whereby the vaporous heat passing to condenser 42 in Example 1 is used for a heat supply at a mid-point of column 30, are familiar to those skilled in the art, and will not be exemplified.

I have found that in those cases, where for any special reason it is desired to minimize or eliminate any appreciable acid discharge in the water layer leaving the decanter 33, this may be accomplished by using a distilling column of moderate efficiency at 30 and returning as reflux wash to the top of 30 a part of the acid free solvent discharging in 44. From about 0.25 to 10 times as much solvent should be returned as is flowing back from the decanter 33. Thus, with a column of proper efficiency and ample reflux (the amount of which may be controlled) acid can be kept from the top of column 30 and decanter 33. Since a definite amount of the solvent-entrainer has to circulate to the extractor 10, it is apparent that a somewhat larger amount than otherwise will have to be added to the system to circulate only in the distilling columns 30 and 40 together with their accessories and connections.

Furthermore, I have found in those cases where the extracting column 10 is not used and only the azeotropic column 30 separates water from the dilute acid mixture alone by means of entrainers boiling in my preferred range that here again the acid-free entrainer, in the amount above indicated, discharging from column 40 by line 44, may be returned to the top of 30 to hold down acid. In this latter case, where there is no extractor 10, all of the liquid discharged in 44 will pass to the top of 30. The aqueous layer, free of acid, will pass directly to the water stripping column 20. In the usual case, it is only desirable to use this method for the azeotropic dehydrating distillation without extraction with those of my preferred materials which may be separated by straight distillation from acetic acid, although it is contemplated that, especially in concentrating other homologous acids, this method may be used in conjunction with the addition of an entrainer for removing the acid in an azeotropic distillation employing the condenser 42, the decanter 43, and the added column 50 in the manner above described.

I have found, moreover, that this process is particularly adaptable to the handling of dilute acids resulting from cellulose processing or other operations where an amount of non-volatile impurities is present in the dilute acid to be concentrated. There are several methods of removing these impurities which may be used in conjunction with this process:

(1) The solids may be removed by preliminary chemical processing and/or filtration as, for example, the hydrolysis under pressure of cellulose acetate, and the subsequent filtration of the cellulosic residue to give a suitable liquor for the concentrating steps.

(2) A preliminary extraction with a selected solvent may be conducted on the dilute liquors to remove the solids or non-volatile material which would subsequently occasion difficulty in the concentrating step.

(3) A dilute acid may be extracted in the extractor 10 by a solvent from among my preferred group in which the solids are insoluble. Thus they will be discharged either in solution, in suspension, or both, in the water layer leaving the extractor.

(4) The liquid may be pre-evaporated before feeding to the concentrating system; and in the event that only an azeotropic system is used without a preliminary extraction step, the vapors may be passed directly to the azeotropic column for concentration.

(5) A pre-evaporation with a single or multiple effect unit may be conducted with the removal of the solids as under (4) and with the vaporous heat from this single or multiple effect evaporator passing to the heating unit 31, 41, and/or 51 for supplying heat to their respective columns. The dilute acid condensate from these heating units is then passed back to the extraction column 10.

(6) The solids or non-volatile materials in solution may be extracted along with the acid by a solvent chosen from my preferred list of solvents having suitable extraction ability for these materials as well as for the acid. The solvent may then be evaporated away from the solid at a subsequent step in the process, e. g. during passage from 40 to 12. (In the previous art utilizing low boiling solvents all of the solvent is necessarily removed by distillation away from acetic acid, in which the non-volatile materials may be soluble; and acetic acid is then distilled away from the non-volatile impurities.)

(7) When the solid impurities are partly or entirely extracted in my preferred solvents along with the acid, they may be decomposed due to the high temperature of the heating belts 31 and 41, and may then be removed from the solvent by a filtration step before re-using the solvent, or by precipitation in contacting the liquids in 10.

I prefer to use in my process solvents which have higher boiling points than that of acetic acid, such as amyl acetate mentioned. Nevertheless, my process is also operative with solvents having boiling points in the neighborhood of that of acetic acid although in some cases it will be necessary or advantageous to use an additional azeotropic distillation for removing the acetic acid from the solvent such as described in conjunction with the use of butyl acetate.

Whereas I have referred above mainly to acetic acid in the description of my process of water separation by the use of an extracting agent which may itself be used as an entrainer for dehydrating the extract layer by azeotropic distillation prior to separation of the acid from the solvent, I have found that the process may be used for the concentration of aqueous solutions of other aliphatic acids having not more than four carbon atoms in the molecule and either saturated or unsaturated with respect to hydrogen. Such acids which may be concentrated thus include formic, acetic, propionic, acrylic, n-butyric, and iso-butyric acids; and the process may be used for the concentration of the aqueous solution of any mixture of two or more of these acids.

It will be understood by those skilled in the art that many arrangements of standard equipment may be used to carry out the features of my invention, and are within the spirit of my disclosure as limited and defined by the appended claims.

In particular, it may be noted that any standard type of extractor and distilling columns or other equipment, efficient for this purpose, may be used, that dilute solutions of any of the lower aliphatic acids or any combinations of two, three or more may be concentrated; that any combination of liquid and/or vaporous methods of introducing the feeding materials commonly employed by those skilled in the art may be used in the distilling columns or in the extractor, which may be used for extracting vapors of the dilute acids rather than liquids; that various mixtures of my preferred materials may be used in combination as well as singly; that the acid produced may be either partly or completely dehydrated and passed from the distilling systems in either a liquid or a vaporous condition; that any desired pressure and any desired temperature up to the boiling point of the dilute acid at the operating pressure or any temperature gradient may be used for liquid-liquid extracting and decantation to take advantage of that temperature or temperature gradient at which extraction rate or distribution coefficient is most favorable, or where solvent body has a favorable viscosity; that any combination of heat recovery equipment or methods known to the art may be employed in conjunction with preheating liquid feeds, etc., in utilization of the heat present at the high temperature necessarily employed; and that any degree of pressure or vacuum which is practical on an industrial scale may be maintained in either the extraction or distillation parts of the operation.

In the specifications above and the claims hereinafter, the use of the terms "extract layer" and "solvent layer" refers, as is standard usage in the art, to that body of liquid consisting mainly of solvent used for the extraction operation in question, which body of liquid discharges from the extraction step. The solvent itself is the liquid chosen for its solvent properties with respect to dissolving acetic acid away from its aqueous solutions; and besides the solvent itself and the acetic acid which it has dissolved away from the original aqueous solution, this extract or solvent layer has also dissolved in it some water. By far the largest amount of the solvent or extract layer is solvent and then, in much smaller amount, is acetic acid; and, finally, in even smaller amount, is water.

Having described my invention, what I claim and desire to secure by Letters Patent is as follows:

1. In a process for concentrating aqueous solutions of acetic acid, the steps of: extracting with a solvent boiling between the boiling point of acetic acid and 150° C.; forming an extract layer; dehydrating the extract layer by the use of the solvent itself as an entrainer in an azeotropic distillation; decanting the condensate into a solvent layer and a water layer; returning the condensed solvent layer to the azeotropic distillation column; discharging the acid-solvent mixture as a bottoms product from the azeotropic distillation; distilling off the acid from said acid-solvent mixture; and recycling the solvent to the extraction step.

2. In a process for concentrating aqueous solutions of acetic acid, the steps of: extracting with a solvent boiling between the boiling point of acetic acid and 150° C.; forming an extract layer; dehydrating the extract layer by the use of the solvent itself as an entrainer in an azeotropic distillation wherein some acid is also less present in the vapors; condensing said vapors from said azeotropic distillation; decanting the condensate into a solvent layer and a water layer containing some acid; returning said water layer to the extraction step; returning the condensed solvent layer to the azeotropic distillation column; discharging the acid-solvent mixture as a bottoms product from the azeotropic distillation; distilling off the acid from said acid-solvent mixture; and recycling the solvent to the extraction step.

3. In a process for concentrating aqueous solutions of acetic acid containing as impurities other aliphatic acids having not more than four carbon atoms in the molecule, the steps of extracting with a solvent boiling between the boiling point of acetic acid and 150° C.; forming an extract layer; dehydrating the extract layer by the use of the solvent itself as an entrainer in an azeotropic distillation; condensing the vapors from said azeotropic distillation; decanting the condensate into a solvent layer and a water layer; returning the condensed solvent layer to the azeotropic distillation column; discharging the acid-solvent mixture as a bottoms product from the azeotropic distillation; distilling off the acid from said acid-solvent mixture; and recycling the solvent to the extraction step.

4. In a process for concentrating aqueous solutions of acetic acid, the steps of: extracting with amyl acetate; forming an extract layer; dehydrating the extract layer by the use of amyl acetate itself as an entrainer in an azeotropic distillation; condensing the vapors from said azeotropic distillation; decanting the condensate into an amyl acetate layer and a water layer; returning the condensed amyl acetate layer to the azeotropic distillation column; discharging the acid-amyl acetate mixture as a bottoms product from the azeotropic distillation; distilling off the acid from the said acid-amyl acetate mixture; and recycling the amyl acetate to the extraction step.

5. In a process for concentrating aqueous solutions of acetic acid, the steps of: extracting with methyl amyl ketone; forming an extract layer; dehydrating the extract layer by the use of methyl amyl ketone itself as an entrainer in an azeotropic distillation; condensing the vapors from said azeotropic distillation; decanting the condensate into a methyl amyl ketone layer and a water layer; returning the condensed methyl amyl ketone layer to the azeotropic distillation column, discharging the acid-methyl amyl ketone mixture as a bottoms product from the azeotropic distillation; distilling off the acid from the said acid-methyl amyl ketone mixture; and recycling the methyl amyl ketone to the extraction step.

6. In a process for concentrating aqueous solutions of acetic acid, the steps of: extracting with a mixture of amyl acetate-amyl alcohol; forming an extract layer; dehydrating the extract layer by the use of a mixture of amyl acetate-amyl alcohol itself as an entrainer in an azeotropic distillation; condensing the vapors from said azeotropic distillation; decanting the condensate into an amyl acetate-amyl alcohol layer and a water layer; returning the condensed amyl acetate-amyl alcohol layer to the azeotropic distillation column, discharging the acid-amyl acetate-amyl alcohol mixture as a bottoms product from the azeotropic distillation; distilling off the acid from the said acid-amyl acetate-amyl alcohol mixture; and recycling the amyl acetate-amyl alcohol mixture to the extraction step.

DONALD F. OTHMER.